United States Patent [19]
Kunkle

[11] 3,930,828
[45] Jan. 6, 1976

[54] THERMAL CONTROL IN A GLASS SHEET FORMING CHAMBER

[75] Inventor: Gerald E. Kunkle, New Kensington, Pa.

[73] Assignee: PPG Industries, Inc., Pittsburgh, Pa.

[22] Filed: Oct. 15, 1974

[21] Appl. No.: 514,989

Related U.S. Application Data
[63] Continuation-in-part of Ser. No. 483,508, June 27, 1974.

[52] U.S. Cl................ 65/65 A; 65/99 A; 65/182 R
[51] Int. Cl.².......................................... C03B 18/02
[58] Field of Search............... 65/182 R, 65 A, 99 A

[56] References Cited
UNITED STATES PATENTS
| | | | |
|---|---|---|---|
| 3,503,728 | 3/1970 | Itakura | 65/182 R |
| 3,645,713 | 2/1972 | Brichard | 65/99 A |

Primary Examiner—Arthur D. Kellogg
Attorney, Agent, or Firm—E. Kears Pollock

[57] ABSTRACT

Glass advancing along the surface of a pool of molten metal and being formed into a continuous sheet of flat glass is controllably cooled by advancing over successive molten metal containing compartments partially separated from one another by barriers and each provided with individually controllable cooling facilities.

8 Claims, 4 Drawing Figures

THERMAL CONTROL IN A GLASS SHEET FORMING CHAMBER

CROSS-REFERENCE TO RELATED APPLICATION

This application is a continuation-in-part of application Ser. No. 483,508, entitled "Manufacture of Glass" filed June 27, 1974 by Gerald E. Kunkle. The complete disclosure of that application is incorporated by reference herein and priority as to all commonly disclosed subject matter is asserted.

BACKGROUND OF THE INVENTION

Field of the Invention: This invention relates to a method for the manufacture of a continuous sheet of flat glass by supporting molten glass on a pool of molten metal while forming and cooling glass. More particularly, this invention relates to a method for controllably cooling the glass as it advances along the molten metal during forming.

Description of the Prior Art: Molten glass may be delivered onto molten metal and formed into a continuous sheet or ribbon of glass according to the teachings of Heal, U.S. Pat. No. 710,357 or of Hitchcock, U.S. Pat. No. 789,911 or according to the patents of Pilkington, U.S. Pat. No. 3,083,551 and U.S. Pat. No. 3,220,816. These patents describe processes in which molten glass delivery techniques vary. In one practice disclosed by Pilkington, molten glass is delivered through a long, narrow canal and over a lip from which the molten glass falls onto molten metal and spreads laterally outwardly on the molten metal for forming.

In the methods of Heal and Hitchcock, molten glass is delivered over a refractory bridge or wall onto molten metal. In the method of Heal the glass flows downwardly from a supporting bridge onto the surface of a pool of molten metal. In the method of Hitchcock, the molten glass is delivered substantially horizontally through an opening in a wall onto the surface of a pool of molten metal which is maintained at substantially the same elevation as the bottom of the opening in the wall over which the molten glass is delivered.

Following delivery of molten glass onto molten metal in the processes described above, the glass is advanced along the surface of the pool of molten metal as a layer and is cooled to form a dimensionally stable, continuous sheet or ribbon of glass. This is so in all of the described methods. In the methods of Hitchcock and Heal, the continuous sheet of glass is removed horizontally from the pool of molten metal and is thereafter conveyed away from the apparatus which is formed. In the process described by Hitchcock, an annealing chamber is provided so that the glass may be annealed while supported on a shallow segmented pool of molten metal. In the processes of Pilkington, the glass is removed from the pool of molten metal by lifting it slightly and supporting it on rolls to convey it away from the apparatus containing the pool of molten metal on which the glass is formed.

In the patent to Hitchcock there is shown a plurality of barriers for segregating the bottom of a forming chamber into a series of compartments for containing different metal alloys having different melting points. The compartments are provided with heating elements submerged in the molten metal for controlling the temperature of the molten metal in each compartment and maintaining it in a molten state. Barriers are also illustrated in U.S. Pat. No. 3,241,939 to Michalek and in U.S. Pat. No. 3,485,617 to Lawrenson. These barriers are disclosed as being useful to retard the flow of molten metal along or counter to the direction of glass advance on the surface of a pool of molten metal that is presumably of like composition throughout. Temperature regulators are illustrated in the bottom of the chamber disclosed by Michalek and in the molten metal in the chamber disclosed by Lawrenson.

In the practice of this invention, as in known forming methods, a continuous sheet of flat glass is produced by a method including the following steps: molten glass is delivered onto the surface of a pool of molten metal maintained within a forming chamber. The molten metal is preferably tin, an alloy of tin or some other metal having a specific gravity greater than glass, having a melting point lower than the glass to be formed, and being substantially non-reactive with the glass at its melting temperature. The molten glass is advanced along the surface of the pool of molten metal and is cooled during such advance to form a dimensionally stable, continuous sheet of glass.

Forces are applied to the glass while it is advanced along the surface of the pool of molten metal. There are forces applied to the glass which are aligned substantially along its path and which cause it to be advanced in that path and to be attenuated or thinned during its advance. These forces, characterized as longitudinal tractive forces, may be applied to the glass at any location along its path. They are preferably applied to the glass at locations well along its path of advance and are transferred to the hotter, more fluid, glass primarily by the surface tension of the glass.

After the glass has been cooled sufficiently to become dimensionally stable (that is, it has reached its final width and thickness) it is advanced farther along the surface of the molten metal a short distance and then is lifted from the surface of the pool of molten metal. It may be lifted and conveyed upwardly, slightly upwardly then horizontally, or horizontally from the pool of molten metal by applying a tractive force to the sheet of glass. Such a tractive force is preferably applied at a location sufficiently remote from the pool of molten metal so that the means employed to apply such a force to the glass does not impart a permanent marking or imprint to the surface of the glass. In the practice of this invention, this force may be effectively transferred along the glass through the location of glass removal or lifting and to hotter, more fluid, glass in the upstream region of the forming chamber so as to cause attenuation of the glass. In a preferred embodiment the glass is conveyed upwardly along a path that forms an angle of at least about 60° with the horizontal surface of the pool of molten metal upon which the molten glass has been formed into a continuous sheet. More preferably, the glass is lifted and conveyed upwardly along a substantially vertical path that is from 80° to 100° from the horizontal path of the advancing glass prior to lifting.

In the practice of this invention, it is preferred that a layer of molten glass be delivered along a substantially horizontal path onto the pool of molten metal with the upper surface of the pool of molten metal upon which the glass is supported and maintained at substantially the same elevation as such delivery. Nevertheless, this invention may be successfully practiced to improve methods wherein glass is delivered for forming by pouring as in U.S. Pat. No. 3,220,816 or by delivering a preformed ribbon as in U.S. Pat. No. 3,083,551.

SUMMARY OF THE INVENTION

During the advance of the glass along the surface of the pool of molten metal, the temperature of the glass is adjusted and maintained at a plurality of discrete locations along its path. Preferably, the glass is continuously and monotonically cooled during its advance. Such cooling is characterized by the fact that the temperature of the glass at each of the discrete locations at which its temperature is adjusted and maintained is less than the temperature of the glass at the next previous discrete location and greater than the temperature of the glass at the next succeeding discrete location. In other words, as the glass moves from an upstream location to a downstream location through the forming chamber on the surface of the molten metal, its temperature continues to decline, and the glass is not subjected to reheat as in many conventional float processes. As a practical matter, it is difficult to measure the temperature of the glass at adjacent locations closer together than about six inches. Therefore, the glass will be detected to be undergoing monotonic cooling if the temperature of the glass measured and successive locations that are 6 inches apart and the measured temperatures indicate a continuing decline of temperature without any intervening measured temperature being greater than a preceding measured temperature. The glass temperature may be easily measured using a conventional pyrometer such as a Radiamatic$^{TM}$ pyrometer sold by Honeywell Co., Washington Park, Pennsylvania.

The temperature of the glass is adjusted and maintained at discrete locations by advancing it over molten metal (preferably tin or an alloy of tin) in separate compartments partially segregated from one another by barriers submerged in the pool of molten metal. The separate compartments of molten metal communicate with one another just below the advancing glass as the upper surface of each barrier is spaced from the upper surface of the pool of molten metal. Each compartment of molten metal for providing temperature control has a cooler in thermal communication with it. The coolers are preferably embedded in the bottom of the forming chamber between adjacent barriers although they may be submerged in the molten metal itself. If submerged in the molten metal the coolers are preferably closer to the bottom of the compartment than to the upper surface of the pool of molten metal.

During operation, heat is transferred from glass advancing over a compartment to the molten metal in the compartment and by conduction and convection through the molten metal and to the cooler associated with the compartment. In this way the rate of heat transfer from the glass is controlled and gentle.

In order to establish a desirable pattern of convection within the molten metal of a compartment it is preferred that the cooler associated with the compartment provide for substantial cooling in the upstream portion of the compartment which is the portion of the compartment over which advancing glass first passes. Thus, in a preferred embodiment of this invention a cooler is placed transversely across the width of a compartment midway between the adjacent barriers defining the compartment. In other preferred embodiments of the invention a cooler is placed between the upstream barrier and such a midway location. In these embodiments of the invention a circulating convective flow of molten metal is established which is counter to the glass advance near the surface of the pool of molten metal and in the direction of glass advance near the bottom of the compartment. The glass that has advanced farther encounters cooler molten metal and, as the glass and molten metal pass one another, the metal warms and, therefore, cools less drastically the glass that has advanced less. Were the convective metal flow cocurrent with the glass advance the glass would be cooled more drastically immediately after passing over the upstream portion of the compartment.

In the production of some thicknesses of glass at high speeds and short residence times it may be desirable to position coolers in the downstream portions of metal compartments. This may be done to increase cooling sufficiently to quickly cool the glass in a short time without regard to the rate of heat transfer at different locations within a particular compartment.

In the practice of this invention, it is desirable to adjust or control the temperature of the glass so that its viscosity will be within the range from about $10^5$ to $10^{12.5}$ poises at the time of lifting or removal from the pool of molten metal in the forming chamber. It is further desirable when the glass is lifted upwardly to adjust and maintain the temperature of the glass during its upward conveyance so that its temperature will be decreased sufficiently to cause its viscosity to be greater than about $10^{13}$ poises by uniformly cooling the glass at one rate of cooling and thereafter, while maintaining the glass in planar alignment, cooling it at a relatively more rapid rate while continuing to convey the glass upwardly, and then maintaining the glass in substantially planar alignment while cooling it relatively more slowly until its viscosity is greater than about $10^{14.5}$ poises. During the cooling of the glass as it is conveyed from the pool of molten metal, it is desirable to cool it sufficiently so that its viscosity is greater than about $10^{13}$ poises before the central portion of the sheet of glass is contacted by any solid object, particularly any object that contacts it with sufficient pressure to apply upward force to it. The glass, nevertheless, may be contacted at its edges by rolls substantially at or immediately above the location where it is lifted or removed from the surface of the pool of molten metal.

When the glass is lifted slightly and then supported and conveyed horizontally it is desired to cool the glass to have a viscosity of at least about $10^{13.5}$ poises prior to lifting it. When the present method is employed to produce glass having a thickness substantially less than the thickness which would be obtained by the glass at equilibrium with the molten metal when it is supported by the molten metal, it is desirable to apply transverse, outwardly aligned forces to the glass substantially immediately following its delivery as it is being advanced and cooled. Such forces are effective to laterally or transversely attenuate or thin the glass. This may be, and preferably is, accomplished in a manner such that the width of the layer, and ultimately the sheet of glass, being advanced along the surface of the pool of molten metal is maintained substantially constant and equal to the width of the layer delivered onto the surface of the pool of metal. The outward transverse forces may be applied in a manner such that the width of the formed sheet of glass advancing along the surfaces of the molten metal prior to lifting is greater than or less than the layer of molten glass delivered to the surface of the molten metal.

The present method has been found to be particularly suitable for producing thin, flat glass of soda-limesilica composition. When producing such glass, the molten metal employed in the forming chamber consists essentially of tin and there is provided within the forming chamber a protective atmosphere containing an inert gas such as nitrogen and an oxygen scavenger such as hydrogen. Other protective atmospheres are contemplated; for example, carbon monoxide or hydrocarbon mixtures may be employed.

Forming chambers suitable for producing soda-lime-silica glasses may be quite short. By providing means for delivering molten glass onto molten metal along a substantially horizontal path, it is possible to successfully construct and operate a forming chamber on the order of 10 feet long and 10 feet wide. Such a forming chamber may be conveniently constructed in place of a conventional Pittsburgh or Fourcault drawing kiln so that a Pittsburgh or Fourcault drawing machine may be employed as a conveyor for the glass. Thus, suitable apparatus for forming glass according to this method may be easily and cheaply constructed to replace a drawing kiln of a sheet glass furnace in an existing factory. It is possible to take advantage of the presence of an existing glassmaking furnace, existing drawing machines, existing cutting equipment and an existing wareroom by converting a sheet glass factory to one employing this process.

In order to make a full range of flat glass products, it has been found desirable to construct a glassmaking facility having several forming chambers connected to a common furnace. The present process may be carried out successfully using a forming chamber connected to the refiner of an existing sheet glass furnace to which there are connected one or more sheet drawing kilns such as Pittsburgh drawing kilns. The present process is a sufficiently broad range of acceptable temperatures for delivering molten glass for forming so that sheet drawing kilns connected to the same refiner as the present forming chamber may be operated in the conventional manner with the molten glass in the refiner having its temperatures and flows controlled to satisfy the more sensitive and less stable sheet drawing processes being carried out from the drawing kilns. It is more preferred, however, to employ a glassmaking facility having no sheet drawing kilns attached to the furnace but, rather, having several forming chambers of the present vertical or horizontal lift-off kind attached to it.

The forming chambers that are connected to the sides of a furnace. as well as any connected at an end wall, are preferably employed in conjunction with an apparatus for enhancing or accelerating glass flow into the forming chambers in the manner of the process described and claimed in application Ser. No. 338,497, now U.S. Pat. No. 3,843,346. Preferably, a submerged cooler extends across the opening into the forming chamber. The cooler is inserted in the pool of molten glass in the refiner of the furnace and beneath the elevation of the molten glass delivery means. Such coolers are particularly beneficial in converted sheet glass furnaces having relatively deep refiners and are most useful in furnaces serving sheet glass kilns in addition to one or more of the present forming chambers.

In a forming chamber constructed according to the principles of this invention the barriers may be graphite or other carbon material which is less dense than molten tin which is the common and preferred molten metal for supporting glass during forming. The barriers may, alternatively, be refractory material or a nonreactive metal such as tungsten or molybdenumtungsten alloy or the like. The bottom of the forming chamber is preferably a refractory having a relatively high thermal conductivity that is substantially uniform throughout. The cooling conduits used in conjunction with the molten metal compartments are pipes, such as iron, steel or stainless steel pipes, preferably the latter. Water, steam, air, nonoxidizing gases or commercial, high heat capacity, organic coolants may be employed. It is beneficial for the establishment of different heat transfer patterns in different compartments or different portions of a single compartment to use two or more coolants having different heat capacities in separate conduits and to vary their flows in a controlled manner to achieve any desired heat transfer pattern.

The cooling of the advancing glass through the molten metal by heat transfer to coolant passing through the conduits may be supplemented by general cooling of the exterior of the bottom of the forming chamber. This may be accomplished by natural or forced convection utilizing ambient air around and beneath the forming chamber or utilizing pressurized air supplied to blowers or nozzles located beneath the forming chamber.

DESCRIPTION OF THE PREFERRED EMBODIMENTS

Figure 1:
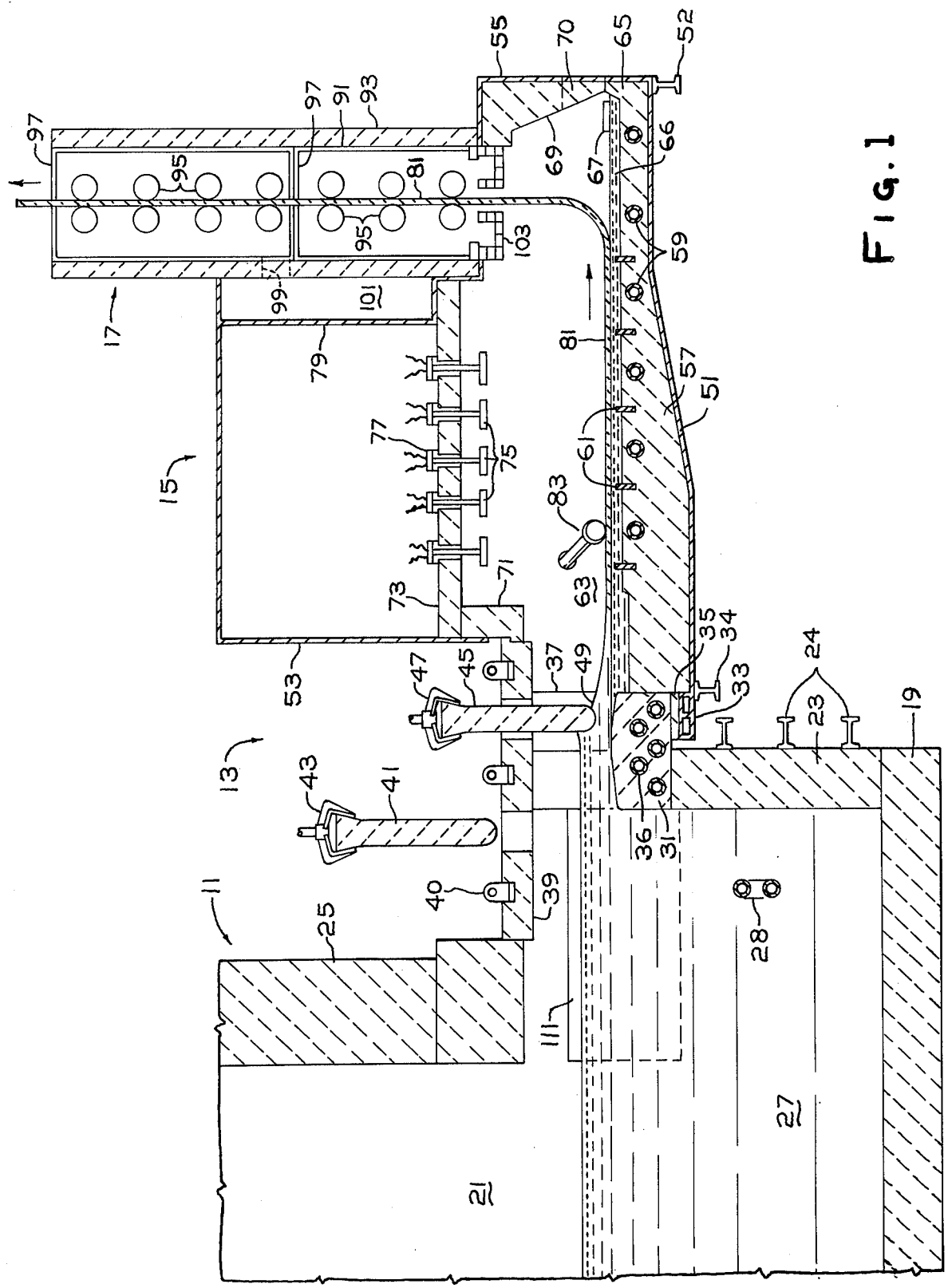
FIG. 1 is a sectional elevation of a suitable apparatus for practicing this invention.
Figure 2:
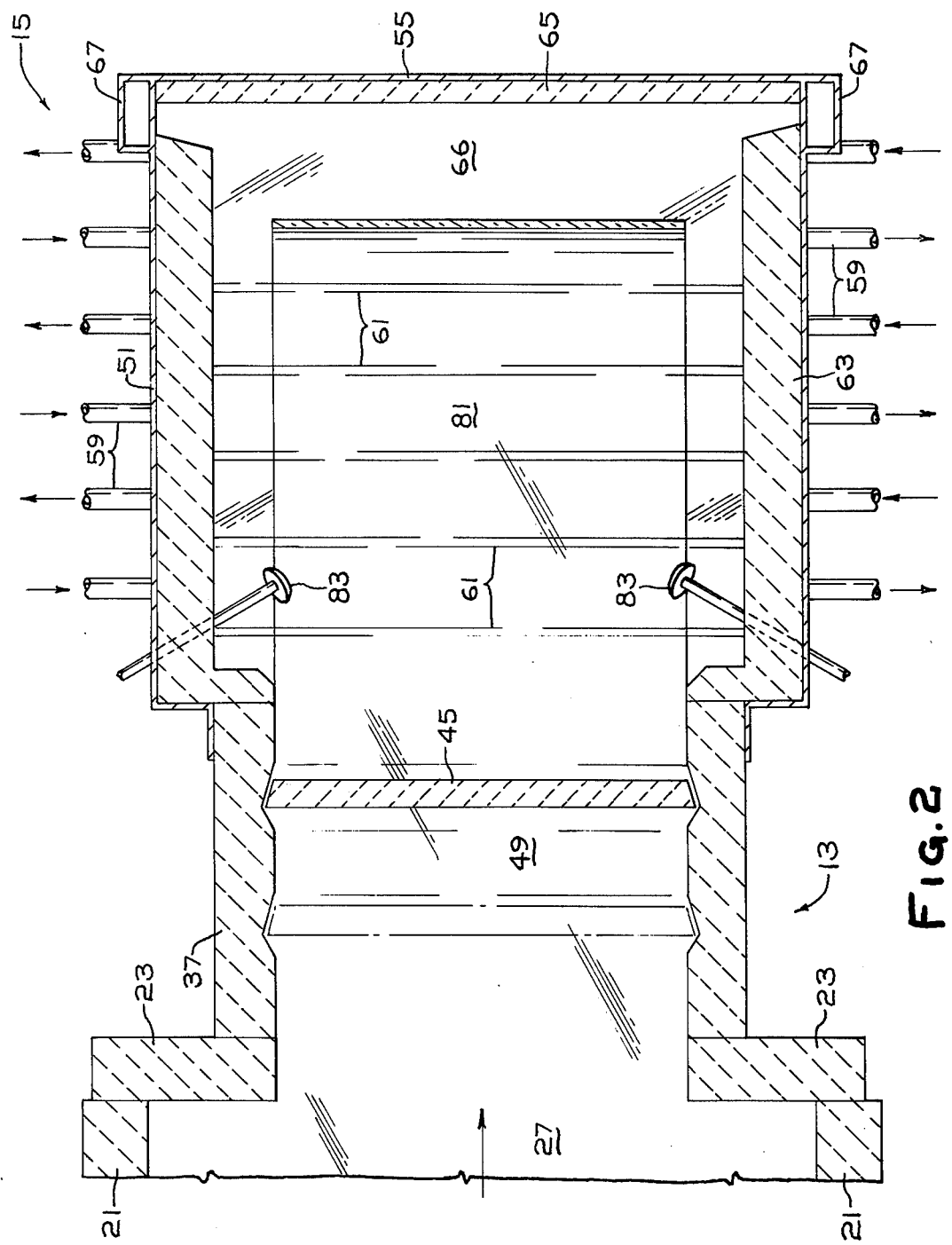
FIG. 2 is a partial sectional plan of an apparatus for practicing this invention.

Referring now to FIGS. 1 and 2, there are shown two views of suitable apparatus for carrying out the present invention. The glassmaking apparatus shown in FIGS. 1 and 2 comprises a furnace 11, delivery means 13 and a forming chamber 15 and a vertical conveyor 17 which may be, and preferably is, included in an annealing lehr.

The glassmaking furnace 11 which is shown in FIGS. 1 and 2 includes a melting section (not shown) and a refiner, the end of which is shown. The refiner or conditioning section of the furnace 11 comprises a furnace bottom 19, side walls 21 and a front basin wall 23. The front basin wall 23 is maintained in position by structural members 24. The furnace further comprises an upper front wall 25, which is preferably suspended or supported from above, and a roof overlying the upper portion of the furnace, the roof not being shown.

The delivery means 13 includes a threshold 31 resting on a cooling block 33 or other support which is supported by structural member 34. A cast refractory seal 35 or the like is disposed between the threshold 31 and the cooling box 33. Extending through holes in the threshold 31 are conduits or pipes 36 for transporting coolant or the like through the interior of the threshold 31 and for controlling its temperature during use. At the ends of the threshold 31 there are side wall portions or jambs 37 which define the sides of a channel through which molten glass may be delivered from the pool of molten glass 27 residing in the bottom portion of the furnace 11. The top of the delivery means 13 is defined by a roof 39, generally of flat arch construction, which is supported by supporting means (not shown) extending above it and connected to flat arch holders 40 embedded in the flat arch itself. Extending transversely across the delivery means 13 are two gates or tweels. The first is a backup tweel 41 connected to a support assembly 43 (not fully shown) for raising and lowering it into engagement with the molten glass in the pool of molten glass 27. The second tweel is a control tweel 45 supported by a support assembly 47 (not fully shown) for raising and lowering the tweel. The tweel is held in operating position in contact with the molten glass to be delivered for forming. The control tweel 45, along with the threshold 31 and the jambs 37, defines an opening through which a layer of molten glass 49 may be delivered for forming.

The forming chamber 15 comprises a bottom casing 51 supported on support 52 in addition to support 34. This casing is preferably a casing constructed of metal, such as steel. The casing is preferably impervious to the molten metal in the chamber. The forming chamber 15 further comprises a top casing 53 and an end casing 55. Both of these casing members are also preferably constructed of impervious metal. Disposed within the bottom casing 51 is a refractory bottom 57, preferably a refractory bottom that has been cast in place inside the bottom casing 51. Preferably embedded within the bottom refractory 57 are pipes 59 through which coolant or other fluid may be directed for controlling the temperature of the forming chamber 15 at discrete locations along its length.

Also extending transversely across the forming chamber 15 are barriers 61 mounted in the refractory bottom 57 and extending across its width. These barriers may be characterized as dams and they are preferably inserted in slots and are held down at their ends at each side of the forming chamber. They are preferably constructed of a material that is less dense than the molten metal in the forming chamber so that their vertical position may be varied upwardly or downwardly by controlled adjustment of their holddown devices at their ends.

The forming chamber 15 further comprises refractory side walls 63 and a refractory exit lip 65. These, along with the bottom refractory 57 and the threshold 21, define a container in which a pool of molten metal 66, preferably molten tin or an alloy of tin, is disposed. At the downstream end of the forming chamber there are provided extensions 67 of the bottom container portion of the forming chamber which serve as cavities into which dross floating on the surface of the molten metal 66 may be drawn for removal from the forming chamber. The upper portion of the forming chamber includes an end wall liner 69, preferably constructed of refractory material. This liner 69 and the end casing 55 to which it is connected may include a suitable opening 70 through which a continuous sheet of glass may be withdrawn from the forming chamber along a substantially horizontal path in the event that such horizontal removal is desired. The upper portion of the chamber further includes a lintel 71 at its upstream or inlet end. This lintel 71 may be used as a means for supporting the delivery means roof 39. Additionally, the upper portion of the chamber includes a ceiling or roof 73 preferably of refractory material which is suitable for radiating and absorbing heat uniformly over the area facing the glass beneath it during operation. Extending through the ceiling of the forming chamber are controllable heating elements 75 used to control the rate of heat removal from the glass during forming. These heating elements 75 are connected to bus bars 77 which are connected in turn to a source of power (not shown). The upper portion of the forming chamber 15 preferably includes a top casing end wall 79 which provides a space between the upper portion of the forming chamber 15 and the upstream or furnace side of the conveyor mechanism 17. During operation a protective gas is directed into the forming chamber and conveyor enclosure. This prevents oxidation of the tin.

Advancing along the surface of the pool of molten tin 66 is a continuous sheet of glass 81 formed from the layer of molten glass 49 delivered onto the pool of molten tin for forming. The glass is preferably formed and delivered in the manner described in copending application Ser. No. 338,497 filed Mar. 6, 1973 now U.S. Pat. No. 3,843,346, however, the glass may be delivered and formed in any convenient manner, such as for example, the manner described in U.S. Pat. Nos. 3,083,551 and 3,220,816.

Extending into the forming chamber through its side walls are edge contacting devices 83 for applying outward tractive forces to the layer of glass 49 during its advance along the surface of the pool of molten metal for forming. These devices 83 are preferably driven wheels disposed and driven in such manner as to supply opposing outward forces to the glass to maintain its width during attenuation and to cause it to be attenuated to thicknesses less than that which would be attained by the glass if allowed to remain on the surface of the molten metal for sufficient time to come to equilibrium with it.

The vertical conveyor 17 comprises a machine casing 91 and thermally insulated machine walls 93. The machine walls 93 are preferably constructed of refractory material. Within the veritcal conveyor there is a series of supporting rolls 95 for engaging a continuous sheet of glass 81 and for conveying it upwardly through the conveyor. These machine rolls are operated in a coordinated manner. They are used to apply sufficient tractive force to the glass to convey it upwardly and to transmit tractive forces along the glass downwardly and about the curved glass to the hotter, more fluid glass within the advancing layer of glass on the surface of the pool of molten metal in the forming chamber. Disposed across the internal space within the conveyor casing at several intervals along its length are machine seals 97 for retarding the flow of gases either upwardly or downwardly through the enclosed space surrounding the rolls 95. Extending through the walls of the enclosed conveyor are openings 99 through which cullet may be directed in the event the continuous sheet of glass is chipped or broken in an upper portion of the conveyor. A space is provided between the top casing of the forming chamber and the wall of the vertical conveyor for accommodating cullet removal. This space is characterized as a cullet chamber 101.

In a preferred embodiment of this invention, coolers 103 are disposed across the bottom of the vertical conveyor to control the removal of heat from a continuous sheet of glass 81 as it is conveyed upwardly from the surface of the pool of molten metal in the forming chamber.

With an understanding of a suitable apparatus for use in practicing this invention, the method of making glass according to this invention may be readily appreciated. The following embodiment of this invention exemplifies it:

Raw batch materials are blended and fed along with cullet to the melter of a glassmaking furnace. These materials are melted to form a pool of molten glass, filling the lower portion of both the melter and refiner of the furnace. Molten glass flows from the melter to the refiner and, by control of temperatures within the pool of molten glass, convective flows also occur within the pool. As the molten glass passes through the refiner, it is gradually cooled and refined.

Molten glass is then delivered from the pool of molten glass 27, in the refiner 11 over the threshold 31 and onto the surface of the pool of molten metal 66 in the forming chamber 15. There, the delivered layer 49 of molten glass is advanced from the vicinity of the threshold 31 toward the location for lifting a sheet of glass 81 from the pool of molten metal. As the glass is advanced, it is gradually cooled and outward forces are applied to it by the rotation of the angled edge wheels 83.

Water is directed through the pipes 59 embedded in the bottom 57 of the forming chamber 15 and the dams 61 are positioned so that their upper surfaces are in close proximity to the surface of the pool of molten metal. In this way the glass is uniformly cooled as it advances over the spaces between adjacent dams. Sufficient cooling is provided between adjacent dams to provide a circulating convective flow of tin in the compartment between the adjacent dams. By adjusting the rate of cooling the temperature of the glass smoothly declines as it passes over each dam.

The heating elements 75 in the ceiling 73 of the forming chamber form a matrix having at least three separately controllable heater zones across the width of the chamber. They are separately controlled to cause the central portion of the advancing layer of glass to cool at least as rapidly as the marginal portions of the advancing layer of glass.

The glass is steadily and monotonically cooled as it advances along the surface of the pool of molten metal. Shortly after the glass has passed from beneath the final pair of edge wheels, it has assumed its ultimate width and thickness and is sufficiently cooled as to lack susceptibility to further stretching or attenuation. The glass is then a dimensionally stable, continuous sheet 81 of glass.

As the dimensionally stable, continuous sheet 81 of glass is advanced along the surface of the pool of molten metal 66, it is further cooled, and desirably its temperatures at all locations through its thickness and across its width are caused to approach a common temperature by controllably cooling the glass from both above using cooler 64 and from below using the embedded coolers 59 in the vicinity of glass lift-off. In this way the glass will be substantially free of stress as it approaches the location at which it is to be lifted from the pool of molten metal. Desirably, the glass is cooled to a temperature such that its viscosity will be between $10^5$ to $10^{10}$ poises for lifting.

The dimensionally stable, continuous sheet of glass is then lifted upwardly from the surface of the molten metal and is conveyed upwardly a substantial distance before engaging a pair of conveying rolls which support and convey it. During this upward conveyance the sheet of glass passes between coolers 103 and is cooled sufficiently to prevent it from being marked when contacted by the rolls. The cooling of the glass is monotonic and gradual to cause the temporary stresses induced in the glass by bending as it is lifted to be fully relaxed before the glass is cooled to its annealing point. The glass is conveyed upwardly while being maintained in planar alignment during cooling. That is, the glass is kept flat during cooling. Alternatively, the continuous sheet of glass may be lifted slightly and conveyed horizontally from the forming chamber.

After the glass is cooled to its annealing point, it is cooled relatively more rapidly than previously and cooling is then continued at that relatively rapid rate or at a lesser rate until the glass temperature falls below its strain point.

As the glass sheet is conveyed upwardly, it passes closely between several seals 97 extending from the conveyor walls 91 into close proximity to the sheet of glass. These seal members retard the ingress of ambient, oxygen-containing air into the forming chamber 15, particularly near the edges of the sheet where downdrafts are likely.

Figure 3:
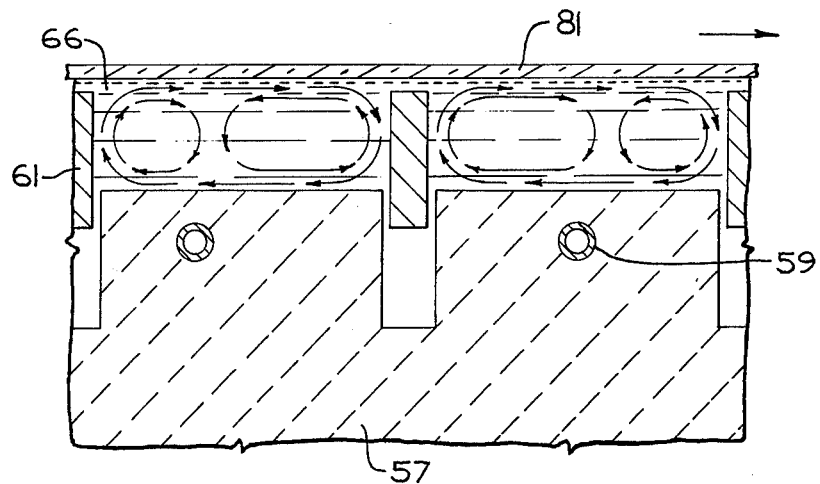
FIGS. 3 and 4 are partial sectional elevations of portions of a forming chamber illustrating in detail the relationship between barriers and coolers employed in combination to practice this invention.
Figure 4:
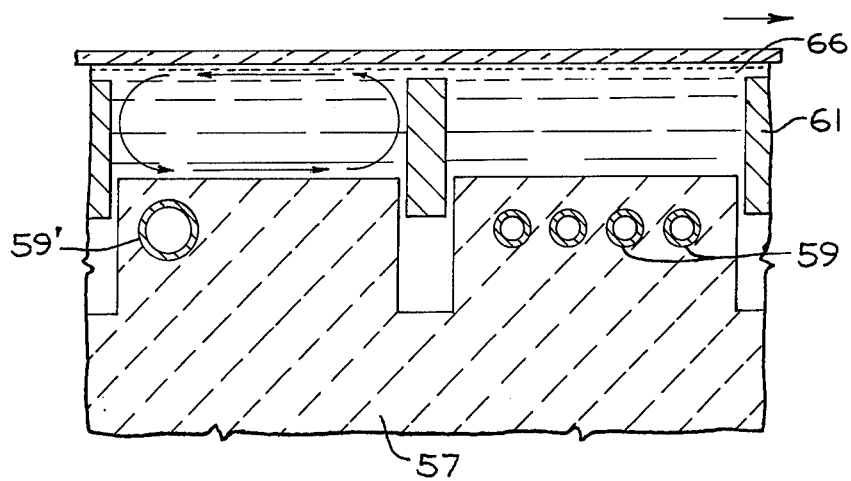

Referring now to FIGS. 3 and 4, details of the present thermal control scheme may be appreciated. In each illustration a portion of a forming chamber is shown with two adjacent compartments of molten metal 66 defined by three successive barriers or dams 61 extending upwardly from the chamber bottom 57. Embedded within the chamber bottom are cooling facilities 59 which comprise conduits or pipes in the illustrated embodiments. A layer or sheet of glass 81 is seen advancing from left to right in each illustration. The direction of glass advance defines the left side of each illustration as the upstream end of the apparatus and process and the right side of each illustration as the downstream end of the apparatus and process.

The right or downstream compartment in FIG. 3 has a cooler associated with it that is located about midway between the barriers defining the compartment. The convection currents in the molten tin in the compartment are represented by the streamlines illustrated by the arrows. A general circulation of tin in a convection cell about the outer perimeter of the compartment is established by the transfer of heat from the glass to the tin. A hot spot extending through the depth of the molten tin in the upstream end of the compartment develops because the hottest glass advancing over the compartment first encounters that portion of tin. The tin rises, flows along with the advancing glass and descends to flow along the bottom of the compartment back to its upstream end. Meanwhile, a cold spot associated with the cooler 59 develops causing a localized downflow of tin near the center of the compartment. Thus, two interior convection cells develop, the downstream cell being slightly smaller than the upstream cell due to momentum and heat transfer between them and the perimeter cell. A series of compartments operated like this downstream compartment are useful to control the removal of heat from an advancing layer or sheet of glass. Nevertheless, more refined thermal control is possible.

The left or upstream compartment in FIG. 3 has a cooler associated with it that is upstream of the midpoint between the adjacent barriers defining the compartment. The effect of locating the cooler in this position is to permit the alteration of the relative sizes of the interior convection cells as shown by the streamlines. This retards the concurrent flow of tin adjacent the advancing glass and enhances the transfer of heat between the glass and the tin. If there is perfect concurrent flow and glass advance at equal speed the temperature differential to drive heat from the glass to the tin rapidly diminishes from the upstream end to the downstream end of a compartment and in the absence of a velocity differential between the glass and tin the interfacial heat transfer resistance becomes larger than when a velocity differential exists. Both of these occurrences are detrimental to heat transfer from the glass to and through the tin. Thus, the rate of heat transfer is enhanced by the arrangement of barriers and cooler in the upstream compartment of FIG. 3 relative to that of the downstream compartment of FIG. 3.

The left or upstream compartment of FIG. 4 has a cooler 59' of larger capacity than those illustrated before and this cooler 59' is located in the extreme upstream portion of this compartment. Sufficient cooling is provided to develop a convection flow that is counter to the advance of the glass at and near the surface of the molten tin. The overall rate of interfacial heat transfer is enhanced relative to that for the previously described compartments, and the rate of heat transfer is relatively constant over the length of the compartment as the temperature differential driving the heat transfer is maintained from the upstream end to the downstream end of the compartment.

The right or downstream compartment of FIG. 4 has several coolers associated with it. When all of these are used to provide substantially equal cooling, the convection flow in the compartment is substantially reduced and the heat transfer rate is primarily influenced by the thermal conductivity of the tin. The upstream coolers in this compartment may be operated by directing water through them as steam is directed through the downstream coolers. In this way heat transfer and convection patterns similar to those of the left, upstream compartment of FIG. 4 may be established. By varying coolants and coolant flows these patterns may be adjusted and controlled to optimize controlled cooling of the advancing glass.

While the several embodiments of this invention have been described and illustrated by reference to detailed specific examples, those skilled in the art will recognize that variations may be made from the described methods and devices without departing from the substance of this invention.

I claim:

1. In a method of making glass comprising the steps of delivering molten glass onto the surface of a pool of supporting molten metal; advancing the glass along the surface of the pool of molten metal while cooling it and applying forces to it to form a continuous sheet of glass; removing the continuous sheet of glass from the surface of the pool of molten metal; and conveying the continuous sheet of glass from the pool of molten metal by applying a force to the glass; the improvement comprising advancing the glass in a path along the surface of the pool of molten metal over a plurality of compartments of molten metal; separated from one another by barriers disposed across the path of advance of the glass, the molten metal of adjacent compartments being in communication immediately beneath the advancing glass; and cooling the molten metal within a compartment by removing sufficiently more heat from the molten metal in an upstream portion of the compartment closest the barrier over which glass first advances than from the molten metal in a downstream portion of the compartment closest the barrier over which the glass advances after advancing over molten metal in the compartment to provide a circulating flow of molten metal in the compartment to cool the glass advancing over the molten metal in the compartment.

2. The method according to claim 1 wherein the molten metal in the upstream portion of the compartment is cooled by transferring heat from the molten metal in the compartment to a coolant flowing through a conduit disposed transversely across the upstream portion of the compartment.

3. The method according to claim 2 wherein the flow of coolant is adjusted and maintained to control the rate at which heat is transferred from the molten metal to the coolant.

4. The method according to claim 2 wherein a plurality of coolants having different heat capacities are directed through a plurality of separate conduits at least some of which are disposed transversely across the upstream portion of the compartment to control the rate of heat transfer from the molten metal to the coolants at separate locations along the path of advance of the glass.

5. In an apparatus for making flat glass comprising a glassmaking furnace for supplying molten glass for forming, means for delivering molten glass from the furnace to a forming chamber, a glass forming chamber for forming a continuous sheet of glass connected to the glassmaking furnace through the molten glass delivery means; and means for removing and conveying a formed continuous sheet of glass from the forming chamber; wherein the forming chamber comprises a bottom, an upstream end in the vicinity of the molten glass delivery means, a downstream end in the vicinity of the glass sheet removing means, side walls and a roof providing an enclosed chamber having in its upper portion a space for containing a protective non-oxidizing atmosphere and having in its lower portion a pool of molten metal for supporting glass during forming, the pool of molten metal having an upper glass-supporting surface and a bottom portion adjacent the chamber bottom; means for advancing the glass along the surface of the pool of molten metal and for applying forces to the glass during its advance, the improvement comprising a plurality of barriers disposed across the forming chamber having upper surfaces at elevations beneath the upper surface of the pool of molten metal and segregating the pool of molten metal into a plurality of molten metal compartments, and means for cooling the molten metal of a compartment disposed beneath the upper surface of the pool of molten metal between adjacent barriers defining the compartment and closer to a first adjacent barrier closest to the upstream end of the chamber than to a second adjacent barrier closest to the downstream end of the chamber.

6. The apparatus according to claim 5 wherein the cooling means is disposed beneath a portion of the bottom of the forming chamber.

7. The apparatus according to claim 6 wherein the cooling means is disposed within the bottom of the forming chamber.

8. An apparatus for making flat glass comprising a glassmaking furnace for supplying molten glass for forming, means for delivering molten glass from the furnace to a forming chamber, a glass forming chamber for forming a dimensionally stable, continuous sheet of glass connected to the glassmaking furnace through the molten glass delivery means; and means for lifting and conveying a dimensionally stable, formed continuous sheet of glass vertically upwardly from the forming chamber; wherein the forming chamber comprises a bottom, an upstream end in the vicinity of the molten glass delivery means, a downstream end in the vicinity of the glass sheet removing means, side walls and a roof providing an enclosed chamber having in its upper portion a space for containing a protective non-oxidizing atmosphere and having in its lower portion a pool of molten metal for supporting glass during forming, the pool of molten metal having an upper glass-supporting surface at substantially the same elevation as a glass supporting member of said molten glass delivery means and a bottom portion adjacent the chamber bottom; means for advancing the glass along the surface of the pool of molten metal and for applying forces to the glass during its advance; and a plurality of barriers disposed across the forming chamber having upper surfaces at elevations beneath the upper surface of the pool of molten metal and segregating the pool of molten metal into a plurality of molten metal compartments; and means for cooling the molten metal of a compartment disposed beneath the upper surface of the pool of molten metal between adjacent barriers defining the compartment.

\* \* \* \* \*